(12) United States Patent
Shkedi

(10) Patent No.: US 10,306,282 B2
(45) Date of Patent: *May 28, 2019

(54) TARGETED VIDEO ADVERTISEMENTS SELECTED ON THE BASIS OF AN ONLINE USER PROFILE AND PRESENTED WITH VIDEO PROGRAMS RELATED TO THAT PROFILE

(71) Applicant: INTENT IQ, LLC, Long Island City, NY (US)

(72) Inventor: Roy Shkedi, Forest Hills, NY (US)

(73) Assignee: INTENT IQ, LLC, Long Island City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,214

(22) Filed: Aug. 29, 2017

(65) Prior Publication Data

US 2018/0146228 A1    May 24, 2018

Related U.S. Application Data

(63) Continuation of application No. 14/946,623, filed on Nov. 19, 2015, now Pat. No. 9,756,372, which is a
(Continued)

(51) Int. Cl.
*H04N 7/025* (2006.01)
*H04N 21/258* (2011.01)
(Continued)

(52) U.S. Cl.
CPC ....... *H04N 21/25891* (2013.01); *G06Q 30/02* (2013.01); *G06Q 30/0224* (2013.01);
(Continued)

(58) Field of Classification Search
CPC ....... H04N 21/25891; H04N 21/23424; H04N 21/252; H04N 21/4316
(Continued)

(56) References Cited

U.S. PATENT DOCUMENTS 5,848,396 A    12/1998 Gerace
5,855,008 A    12/1998 Goldhaber et al.
(Continued)

FOREIGN PATENT DOCUMENTS

EP    1150508    10/2001
EP    1058999    4/2003
(Continued)

OTHER PUBLICATIONS

U.S. Appl. No. 12/536,451, filed Aug. 5, 2009.
(Continued)

*Primary Examiner* — Jivka A Rabovianski
(74) *Attorney, Agent, or Firm* — Louis J Hoffman; David S Alavi

(57) ABSTRACT

In an automatic, computer-implemented method, a selected television advertisement is presented automatically in association with a television program or channel. A relationship is identified between an online user profile and the television program or channel, and the television advertisement is selected based at least in part on information from the online user profile. The selected television advertisement is presented, in association with the television program or channel that is identified as being related to the online user profile, via a set-top box having a corresponding set-top box identifier that is associated with the online user profile.

20 Claims, 8 Drawing Sheets

Related U.S. Application Data continuation of application No. 14/101,156, filed on Dec. 9, 2013, now Pat. No. 9,226,019, which is a continuation of application No. 13/243,314, filed on Sep. 23, 2011, now Pat. No. 8,607,267, which is a continuation of application No. 12/131,824, filed on Jun. 2, 2008, now Pat. No. 8,051,444.

(51) Int. Cl.
| | |
|---|---|
| *G06Q 30/02* | (2012.01) |
| *H04N 5/445* | (2011.01) |
| *H04N 21/45* | (2011.01) |
| *H04N 21/2668* | (2011.01) |
| *H04N 21/426* | (2011.01) |
| *H04N 21/431* | (2011.01) |
| *H04N 21/442* | (2011.01) |
| *H04N 21/658* | (2011.01) |
| *H04N 21/81* | (2011.01) |
| *H04N 21/435* | (2011.01) |
| *H04N 21/234* | (2011.01) |
| *H04N 21/25* | (2011.01) |
| *H04N 21/466* | (2011.01) |
| *H04N 21/478* | (2011.01) |
| *H04N 21/4782* | (2011.01) |

(52) U.S. Cl.
CPC ..... *G06Q 30/0239* (2013.01); *G06Q 30/0277* (2013.01); *H04N 5/44513* (2013.01); *H04N 21/23424* (2013.01); *H04N 21/252* (2013.01); *H04N 21/25808* (2013.01); *H04N 21/25866* (2013.01); *H04N 21/25883* (2013.01); *H04N 21/2668* (2013.01); *H04N 21/42684* (2013.01); *H04N 21/435* (2013.01); *H04N 21/4316* (2013.01); *H04N 21/44222* (2013.01); *H04N 21/4532* (2013.01); *H04N 21/4667* (2013.01); *H04N 21/6582* (2013.01); *H04N 21/812* (2013.01); *H04N 21/4782* (2013.01); *H04N 21/47815* (2013.01)

(58) Field of Classification Search
USPC ......................................... 725/32, 34, 36, 46
See application file for complete search history.

(56) References Cited

U.S. PATENT DOCUMENTS

| | | | |
|---|---|---|---|
| 5,933,811 | A | 8/1999 | Angles et al. |
| 5,945,988 | A | 8/1999 | Williams et al. |
| 5,948,061 | A | 9/1999 | Merriman |
| 6,160,989 | A | 12/2000 | Hendricks et al. |
| 6,216,129 | B1 | 4/2001 | Eldering |
| 6,366,298 | B1 | 4/2002 | Haitsuka et al. |
| 6,377,986 | B1 | 4/2002 | Philyaw |
| 6,385,592 | B1 | 5/2002 | Angles et al. |
| 6,446,261 | B1 | 9/2002 | Rosser |
| 6,536,041 | B1 | 3/2003 | Knudson et al. |
| 6,684,194 | B1 | 1/2004 | Eldering et al. |
| 6,718,551 | B1 | 4/2004 | Swix et al. |
| 6,771,290 | B1 | 8/2004 | Hoyle |
| 6,832,207 | B1 | 12/2004 | Shkedi |
| 6,845,396 | B1 | 1/2005 | Kanojia |
| 6,868,392 | B1 | 3/2005 | Ogasawara |
| 6,925,440 | B1 | 8/2005 | Shkedi |
| 6,944,585 | B1 | 9/2005 | Pawson |
| 6,973,436 | B1 | 12/2005 | Shkedi |
| 7,072,853 | B2 | 7/2006 | Shkedi |
| 7,092,926 | B2 | 8/2006 | Cerrato |
| 7,100,183 | B2 | 8/2006 | Kunkel et al. |
| 7,152,237 | B2 | 12/2006 | Flickinger et al. |
| 7,237,252 | B2 | 6/2007 | Billmaier |
| 7,260,823 | B2 | 8/2007 | Schlack et al. |
| 7,328,448 | B2 | 2/2008 | Eldering et al. |
| 7,370,073 | B2 | 5/2008 | Yen et al. |
| 7,428,493 | B2 | 9/2008 | Shkedi |
| 7,454,364 | B2 | 11/2008 | Shkedi |
| 7,747,745 | B2 | 6/2010 | Shkedi |
| 7,822,637 | B2 | 10/2010 | Shkedi |
| 7,822,639 | B2 | 10/2010 | Shkedi |
| 7,856,372 | B2 | 12/2010 | Ullah |
| 7,856,373 | B2 | 12/2010 | Ullah |
| 7,861,260 | B2 | 12/2010 | Shkedi |
| 7,937,383 | B2 | 5/2011 | Hintze et al. |
| 7,966,647 | B1 | 6/2011 | Igoe et al. |
| 7,979,307 | B2 | 7/2011 | Shkedi |
| 8,015,286 | B2 | 9/2011 | Jenkins |
| 8,024,765 | B2 | 9/2011 | Ramanathan et al. |
| 8,079,048 | B2 | 12/2011 | Howcroft |
| 8,086,491 | B1 | 12/2011 | Matz et al. |
| 8,200,822 | B1 | 6/2012 | Shkedi |
| 8,204,783 | B2 | 6/2012 | Shkedi |
| 8,239,264 | B2 | 8/2012 | Shkedi |
| 8,244,574 | B2 | 8/2012 | Shkedi |
| 8,244,582 | B2 | 8/2012 | Shkedi |
| 8,244,583 | B2 | 8/2012 | Shkedi |
| 8,244,586 | B2 | 8/2012 | Shkedi |
| 8,280,758 | B2 | 10/2012 | Shkedi |
| 8,281,336 | B2 | 10/2012 | Shkedi |
| 8,494,904 | B2 | 7/2013 | Shkedi |
| 8,522,271 | B2 | 8/2013 | Childress et al. |
| 8,566,164 | B2 | 10/2013 | Shkedi et al. |
| 8,589,210 | B2 | 11/2013 | Shkedi |
| 8,595,069 | B2 | 11/2013 | Shkedi et al. |
| 8,600,815 | B2 | 12/2013 | Shkedi |
| 8,671,139 | B2 | 3/2014 | Shkedi |
| 8,677,398 | B2 | 3/2014 | Shkedi |
| 8,683,502 | B2 | 3/2014 | Shkedi et al. |
| 8,695,032 | B2 | 4/2014 | Shkedi |
| 8,713,600 | B2 | 4/2014 | Shkedi |
| 8,775,249 | B2 | 7/2014 | Shkedi |
| 8,959,146 | B2 | 2/2015 | Shkedi |
| 8,997,138 | B2 | 3/2015 | Shkedi |
| 9,071,886 | B2 | 6/2015 | Shkedi |
| 9,076,154 | B1 | 7/2015 | Song et al. |
| 9,078,035 | B2 | 7/2015 | Shkedi et al. |
| 9,083,853 | B2 | 7/2015 | Shkedi |
| 9,131,282 | B2 | 9/2015 | Shkedi |
| 9,208,514 | B2 | 12/2015 | Shkedi |
| 9,271,024 | B2 | 2/2016 | Shkedi et al. |
| 9,299,077 | B2 | 3/2016 | Brubaker |
| 9,351,053 | B2 | 5/2016 | Shkedi |
| 9,369,779 | B2 | 6/2016 | Shkedi |
| 9,508,089 | B2 | 11/2016 | Shkedi |
| 9,571,865 | B2 | 2/2017 | Shkedi |
| 9,591,380 | B2 | 3/2017 | Shkedi |
| 9,800,917 | B2 | 10/2017 | Shkedi |
| 9,813,778 | B2 | 11/2017 | Shkedi |
| 9,830,615 | B2 | 11/2017 | Shkedi |
| 2001/0003184 | A1 | 6/2001 | Ching et al. |
| 2002/0010928 | A1 | 1/2002 | Sahota |
| 2002/0013943 | A1 | 1/2002 | Haberman et al. |
| 2002/0019769 | A1 | 2/2002 | Barrits et al. |
| 2002/0032603 | A1 | 3/2002 | Yeiser |
| 2002/0056088 | A1 | 5/2002 | Silva et al. |
| 2002/0059094 | A1 | 5/2002 | Hosea et al. |
| 2002/0078444 | A1 | 6/2002 | Krewin et al. |
| 2002/0082910 | A1 | 6/2002 | Kontogouris |
| 2002/0083464 | A1 | 6/2002 | Tomsen et al. |
| 2002/0120929 | A1 | 8/2002 | Schwalb et al. |
| 2002/0120933 | A1 | 8/2002 | Knudson et al. |
| 2002/0123928 | A1 | 9/2002 | Eldering et al. |
| 2002/0124249 | A1 | 9/2002 | Shintani |
| 2002/0124253 | A1 | 9/2002 | Eyer et al. |
| 2002/0129362 | A1 | 9/2002 | Chang et al. |
| 2002/0129368 | A1 | 9/2002 | Schlack et al. |
| 2002/0194058 | A1 | 12/2002 | Eldering |
| 2002/0194604 | A1 | 12/2002 | Sanchez et al. |
| 2003/0046689 | A1 | 3/2003 | Gaos |
| 2003/0051242 | A1 | 3/2003 | Donnelly |
| 2003/0066078 | A1 | 4/2003 | Bjorgan et al. |
| 2003/0093311 | A1 | 5/2003 | Knowlson |

(56) References Cited

U.S. PATENT DOCUMENTS

| | | |
|---|---|---|
| 2003/0093792 A1 | 5/2003 | Labeeb |
| 2003/0131355 A1 | 7/2003 | Berenson et al. |
| 2003/0135853 A1 | 7/2003 | Goldman et al. |
| 2003/0145323 A1 | 7/2003 | Hendricks et al. |
| 2003/0149975 A1 | 8/2003 | Eldering et al. |
| 2003/0154128 A1 | 8/2003 | Liga et al. |
| 2003/0208756 A1 | 11/2003 | Macrae et al. |
| 2003/0208758 A1 | 11/2003 | Schein et al. |
| 2003/0221191 A1 | 11/2003 | Khusheim |
| 2003/0229900 A1 | 12/2003 | Reisman |
| 2004/0010546 A1 | 1/2004 | Klug et al. |
| 2004/0031058 A1 | 2/2004 | Reisman |
| 2004/0068744 A1 | 4/2004 | Claussen et al. |
| 2004/0073915 A1 | 4/2004 | Dureau |
| 2004/0078809 A1 | 4/2004 | Drazin |
| 2004/0107437 A1 | 6/2004 | Reichardt et al. |
| 2004/0117827 A1 | 6/2004 | Karaoguz et al. |
| 2004/0163101 A1 | 8/2004 | Swix et al. |
| 2004/0172650 A1 | 9/2004 | Hawkins et al. |
| 2005/0086112 A1 | 4/2005 | Shkedi |
| 2005/0125289 A1 | 6/2005 | Beyda et al. |
| 2005/0125290 A1 | 6/2005 | Beyda et al. |
| 2005/0165638 A1 | 7/2005 | Piller |
| 2005/0165643 A1 | 7/2005 | Wilson et al. |
| 2005/0165644 A1 | 7/2005 | Beyda et al. |
| 2005/0246736 A1 | 11/2005 | Beyda et al. |
| 2005/0283796 A1 | 12/2005 | Flickinger |
| 2006/0116924 A1 | 6/2006 | Angles et al. |
| 2006/0212900 A1 | 9/2006 | Ismail et al. |
| 2006/0248570 A1 | 11/2006 | Witwer |
| 2006/0253323 A1 | 11/2006 | Phan et al. |
| 2006/0271953 A1 | 11/2006 | Jacoby et al. |
| 2006/0277569 A1 | 12/2006 | Smith |
| 2007/0022032 A1 | 1/2007 | Anderson et al. |
| 2007/0033615 A1 | 2/2007 | Hassell et al. |
| 2007/0038516 A1 | 2/2007 | Apple et al. |
| 2007/0073585 A1 | 3/2007 | Apple et al. |
| 2007/0089127 A1 | 4/2007 | Flickinger et al. |
| 2007/0100690 A1 | 5/2007 | Hopkins |
| 2007/0157228 A1 | 7/2007 | Bayer et al. |
| 2007/0180469 A1 | 8/2007 | Finley et al. |
| 2007/0198327 A1 | 8/2007 | Yazdani et al. |
| 2007/0198532 A1 | 8/2007 | Krikorian et al. |
| 2007/0204297 A1 | 8/2007 | Gonzalez |
| 2007/0208619 A1 | 9/2007 | Branam et al. |
| 2007/0220553 A1 | 9/2007 | Branam |
| 2007/0233571 A1 | 10/2007 | Eldering et al. |
| 2007/0244750 A1 | 10/2007 | Grannan et al. |
| 2007/0266400 A1 | 11/2007 | Rogers et al. |
| 2007/0266403 A1 | 11/2007 | Ou et al. |
| 2007/0277220 A1 | 11/2007 | Shikuma et al. |
| 2007/0283384 A1 | 12/2007 | Haeuser et al. |
| 2007/0294721 A1 | 12/2007 | Haeuser et al. |
| 2008/0016540 A1 | 1/2008 | Savoor et al. |
| 2008/0040742 A1 | 2/2008 | Howcroft et al. |
| 2008/0046917 A1 | 2/2008 | de Heer |
| 2008/0109376 A1 | 5/2008 | Walsh et al. |
| 2008/0109843 A1 | 5/2008 | Ullah |
| 2008/0155613 A1 | 6/2008 | Benya et al. |
| 2008/0181225 A1 | 7/2008 | Zampiello |
| 2008/0189360 A1 | 8/2008 | Kiley et al. |
| 2008/0201733 A1 | 8/2008 | Ertugrul et al. |
| 2008/0243822 A1 | 10/2008 | Campbell et al. |
| 2008/0244076 A1 | 10/2008 | Shah et al. |
| 2008/0275785 A1 | 11/2008 | Altberg et al. |
| 2008/0281699 A1 | 11/2008 | Whitehead |
| 2009/0037949 A1 | 2/2009 | Birch |
| 2009/0049468 A1 | 2/2009 | Shkedi |
| 2009/0049469 A1 | 2/2009 | Small et al. |
| 2009/0055862 A1 | 2/2009 | Knoller et al. |
| 2009/0150927 A1 | 6/2009 | Kouhi et al. |
| 2009/0171780 A1 | 7/2009 | Aldrey et al. |
| 2009/0172723 A1 | 7/2009 | Shkedi et al. |
| 2009/0187944 A1 | 7/2009 | White et al. |
| 2009/0299857 A1 | 12/2009 | Brubaker |
| 2010/0058383 A1 | 3/2010 | Chang et al. |
| 2010/0076848 A1 | 3/2010 | Stefanik et al. |
| 2010/0192172 A1 | 7/2010 | Thomas et al. |
| 2010/0287048 A1 | 11/2010 | Ramer et al. |
| 2011/0167043 A1 | 7/2011 | Hintze et al. |
| 2011/0258049 A1 | 10/2011 | Ramer et al. |
| 2012/0023522 A1 | 1/2012 | Anderson |
| 2012/0066385 A1 | 3/2012 | Jenkins |
| 2012/0314140 A1 | 12/2012 | Wiser et al. |
| 2013/0104159 A1 | 4/2013 | John |
| 2013/0254035 A1 | 9/2013 | Ramer et al. |
| 2014/0215503 A1 | 7/2014 | Pharn |

FOREIGN PATENT DOCUMENTS

| | | |
|---|---|---|
| JP | 2003-331183 | 11/2003 |
| JP | 2004-320754 | 11/2004 |
| JP | 2005-311810 | 11/2005 |
| JP | 2006-324763 | 11/2006 |
| JP | 2007-274246 | 10/2007 |
| JP | 2008-125022 | 5/2008 |
| KR | 10-0793513 | 3/2006 |
| KR | 1008141290000 | 3/2008 |
| WO | WO 02/19720 | 3/2002 |
| WO | WO 2005/046237 | 5/2005 |
| WO | WO 2007/047310 | 4/2007 |

OTHER PUBLICATIONS

U.S. Appl. No. 12/912,726, filed Oct. 26, 2010, Dec. 28, 1999.
U.S. Appl. No. 14/089,645, filed Nov. 25, 2013, Dec. 31, 2007.
U.S. Appl. No. 14/091,285, filed Nov. 26, 2013, Nov. 28, 2000.
U.S. Appl. No. 15/429,601, filed Feb. 10, 2017, Jan. 30, 2013.
U.S. Appl. No. 15/450,361, filed Mar. 6, 2017, Jun. 19, 2006 (prov.).
U.S. Appl. No. 15/789,354, filed Oct. 20, 2017, Jun. 2, 2008.
U.S. Appl. No. 15/803,631, filed Nov. 3, 2017, Apr. 17, 2007.
U.S. Appl. No. 15/893,354, filed Feb. 9, 2018, Jun. 19, 2006 (prov.).
Battelle, John; "The Search—How Google and Its Rivals Rewrote the Rules of Business and Transformed Our Culture"; pp. 167-171; 2005.
"BSkyB in Google Link-up"; Financial Times (FT.com); Dec. 6, 2006.
"Google moves into TV ads with BSkyB Deal"; Guardian Unlimited; Dec. 7, 2006.
Chen, Andy; "The New Behavioral Wunder"; from webpage http://www.clickz.com; Apr. 11, 2007.
Keegan, Paul; "The Man Who Can Save Advertising"; from http://money.cnn.com; Nov. 1, 2004.
"Visible World Targets Advertising Industry"; from http://informitv.com; Feb. 20, 2005.
"Venture Market Summary"; VentureWire Alert; Mar. 29, 2005.
"This Ad's for You—Just You"; BusinessWeek online; Jun. 28, 2005.
"Cable's Big Bet on Hyper-Targeting. Time Warner will test new software that sends different ads to different viewers."; BusinessWire online; Jul. 4, 2005.
"TiVo Launches New Interactive Advertising Technology", press release from www.tivo.com; Jul. 18, 2005.
"TiVo Announces First Advertising Search Product for Television"; press release from www.tivo.com; Nov. 28, 2005.
"TiVo Begins Rollout of Online Services Now Accessible Directly on the TV"; press release from www.tivo.com; Dec. 1, 2005.
"TiVo Launches Television's New Advertising Search Product"; press release from www.tivo.com; May 8, 2006.
Shukla, Anuradha; "Visible World Offers 'Any Screen' Solution for Customized Video Advertising"; from www.tmcnet.com; Feb. 6, 2007.
Story, Louise; "The Web drives an advertising boom without the need for agencies"; International Herald Tribune (iht.com); Feb. 8, 2007.
PCT International Preliminary Report on Patentability and Written Opinion of the International Searching Authority in PCT/US2009/046031, dated Dec. 16, 2010.

(56) References Cited

OTHER PUBLICATIONS

PCT International Preliminary Report on Patentability and Written Opinion of the International Searching Authority in PCT/US2009/046033, dated Dec. 16, 2010.

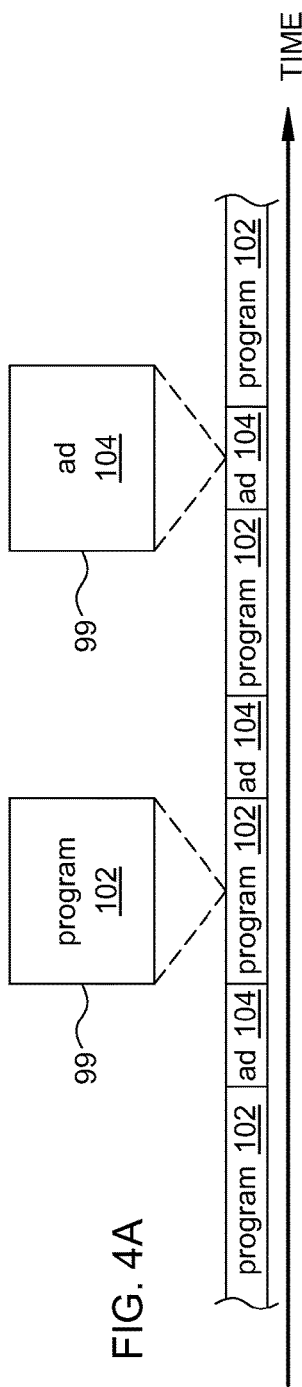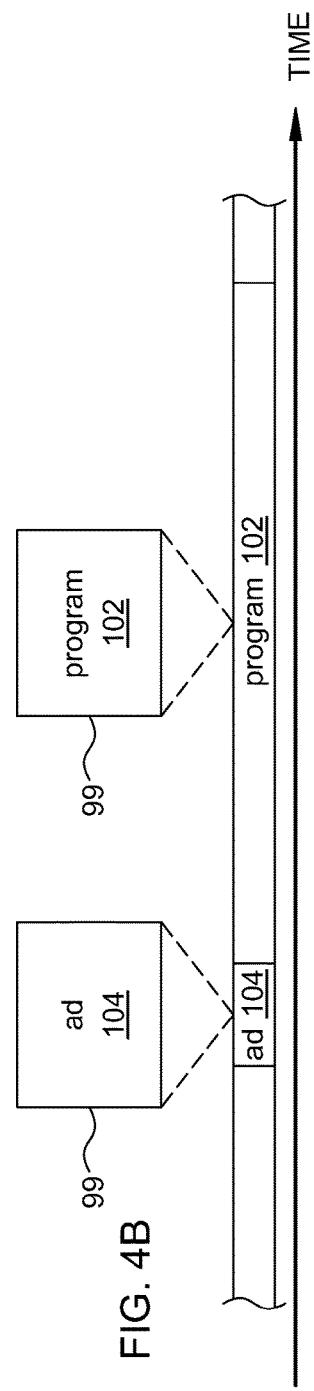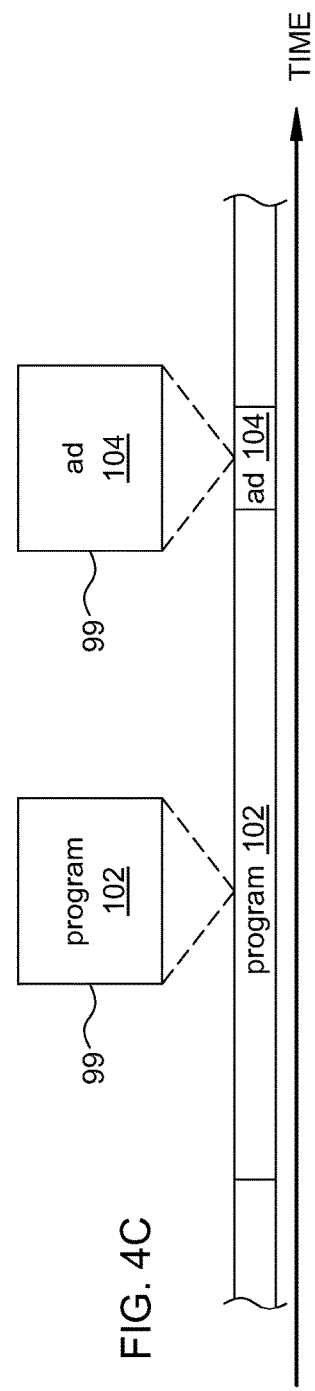

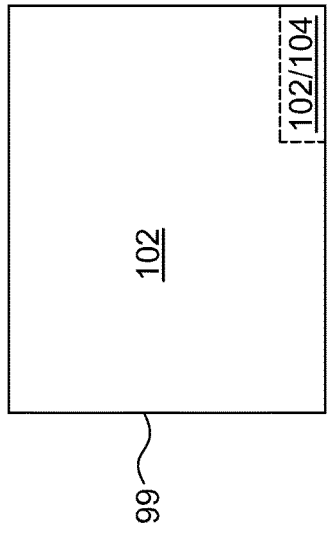
FIG. 5A
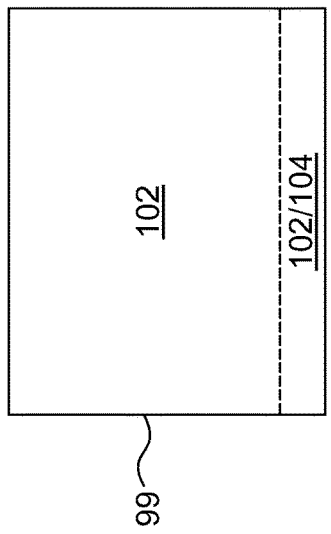
FIG. 5B
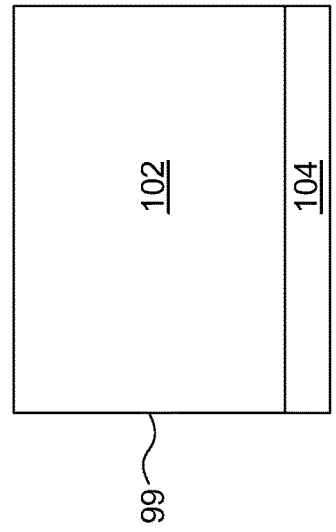
FIG. 5E
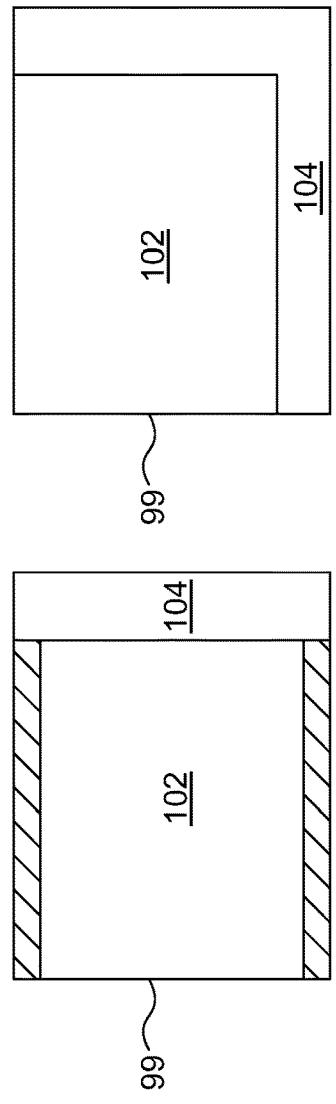
FIG. 5D
FIG. 5C

TARGETED VIDEO ADVERTISEMENTS SELECTED ON THE BASIS OF AN ONLINE USER PROFILE AND PRESENTED WITH VIDEO PROGRAMS RELATED TO THAT PROFILE

CROSS-REFERENCE TO RELATED APPLICATIONS

This application is a continuation of application Ser. No. 14/946,623, filed Nov. 19, 2015, now U.S. Pat. No. 9,756,372, which is a continuation of application Ser. No. 14/101,156, filed Dec. 9, 2013, now U.S. Pat. No. 9,226,019, which is a continuation of application Serial No. 13/243,314, filed Sep. 23, 2011, now U.S. Pat. No. 8,607,267, which is a continuation of application Ser. No. 12/131,824, filed Jun. 2, 2008, now U.S. Pat. No. 8,051,444.

BACKGROUND

The field of the present invention relates to presenting television advertisements that are targeted based on online user profiles. In particular, systems and methods are described for presenting targeted television advertisements, selected on the basis of an online user profile, in association with television programs or channels for which a relationship has been identified with that online user profile.

A variety of systems and methods currently target advertisements based on user/viewer/customer behavior. Many of those rely on collection of personally identifiable information (PII) to correlate the person exhibiting the behavior with advertisements targeted at that person. In some systems, advertisements can be targeted without collecting PII, but in such systems, typically, the advertisement is delivered over the same medium as the medium in which the non-personally identifiable information is measured or collected. For example, many grocery stores hand out so-called "club cards," which can but need not be linked to PII. A shopper presents the card at checkout to receive various discounts, thereby allowing the store to link a list of purchased items to the card. As the system "learns" the purchasing habits of that cardholder, it can begin issuing coupons targeted at purchases that the cardholder has made previously or that the system predicts the cardholder may wish to make based on past purchases. In another example, online advertisements can be targeted based on an Internet user's online activities without using PII. The use of browser cookies enables an ad server to recognize an Internet site visitor (more accurately, the computer or other device used by the visitor) who has previously conducted searches, accessed content, or viewed ads at the same or a different site linked to the ad server. The ad server can target future advertising to the site visitor based on that previous activity, again without necessarily using PII. A user who has searched for airline tickets to southern California on an online travel site, for instance, might later receive targeted online advertisements for Disneyland, which the ad server (the one that collected or received the user's search information from the online travel site) delivers to the user's computer, perhaps while the user is visiting another online site.

Targeting of advertisements becomes significantly more problematic to deliver "cross-medium," i.e., when an advertisement is presented via one medium based on user behavior exhibited, or demographic information learned, in another medium. One example of cross-medium advertising is presentation of television advertisements that are targeted based on an online user profile. One difficulty, however, arises from the need to associate an online access device (e.g., a computer connected to the Internet) and a corresponding television device (e.g., a set-top box). Use of PII can facilitate the proper association. A few methods have been developed to associate computer and TV units without using PII, including, for example, those disclosed in U.S. applications Ser. Nos. 11/736,544 (entitled "Targeted television advertisements based on online behavior" filed Apr. 17, 2007 in the name of Roy Shkedi) and Ser. No. 11/968,117 (entitled "Targeted online advertisements based on viewing or interacting with television advertisements" filed Dec. 31, 2007 in the names of Roy Shkedi and Ronen Shlomo), both of which applications being hereby incorporated by reference in their entirety. Other methods for establishing such associations may exist or may be developed in the future. However the association is made (with or without PII), information from an online user profile collected or generated during computer access of the Internet in a household can be used to select a targeted television advertisement, which can be presented via the set-top box in the household that is associated with the computer.

A problem remains, however, because a household may include multiple users, each of whom independently access online content and independently watch television. A targeted advertisement selected based on online user profile information for a first household member might be wasted if presented to a second household member, especially one for whom the targeted advertisement might not be suitable or effective. For example, a television advertisement for investment advice targeted based on the ad server having recognizing that Dad had checked his online investment account would be wasted if presented on television while Daughter watches a pop music show, even though the ad server has determined that Dad's computer is associated with the set-top box connected to the television watched by Daughter.

It is therefore desirable to provide systems and methods for increasing the probability that a television advertisement targeted based on an online user profile is presented while the corresponding user (i.e., the "target") watches television.

SUMMARY

An automatic, computer-implemented method comprises arranging for presenting automatically, in association with presentation of a television program or channel, a selected television advertisement. A relationship is identified between an online user profile and the television program or channel, which relationship is based at least in part on information from the online user profile. The television advertisement is selected based at least in part on information from the online user profile. The selected television advertisement is presented, in association with the television program or channel that is identified as being related to the online user profile, via a set-top box having a corresponding set-top box identifier that is associated with the online user profile.

Objects and advantages pertaining to presenting television advertisements targeted based on online user profiles may become apparent upon referring to the exemplary embodiments illustrated in the drawings and disclosed in the following written description or appended claims.

BRIEF DESCRIPTION OF THE DRAWINGS

FIG. 4A illustrates schematically a targeted television advertisement temporally interleaved with a selected television program. FIGS. 4B and 4C illustrate schematically a targeted television advertisement presented immediately before or immediately after a selected television program.

FIGS. 5A-5E illustrate schematically a targeted television advertisement spatially combined with a selected television program.

Figure 1:
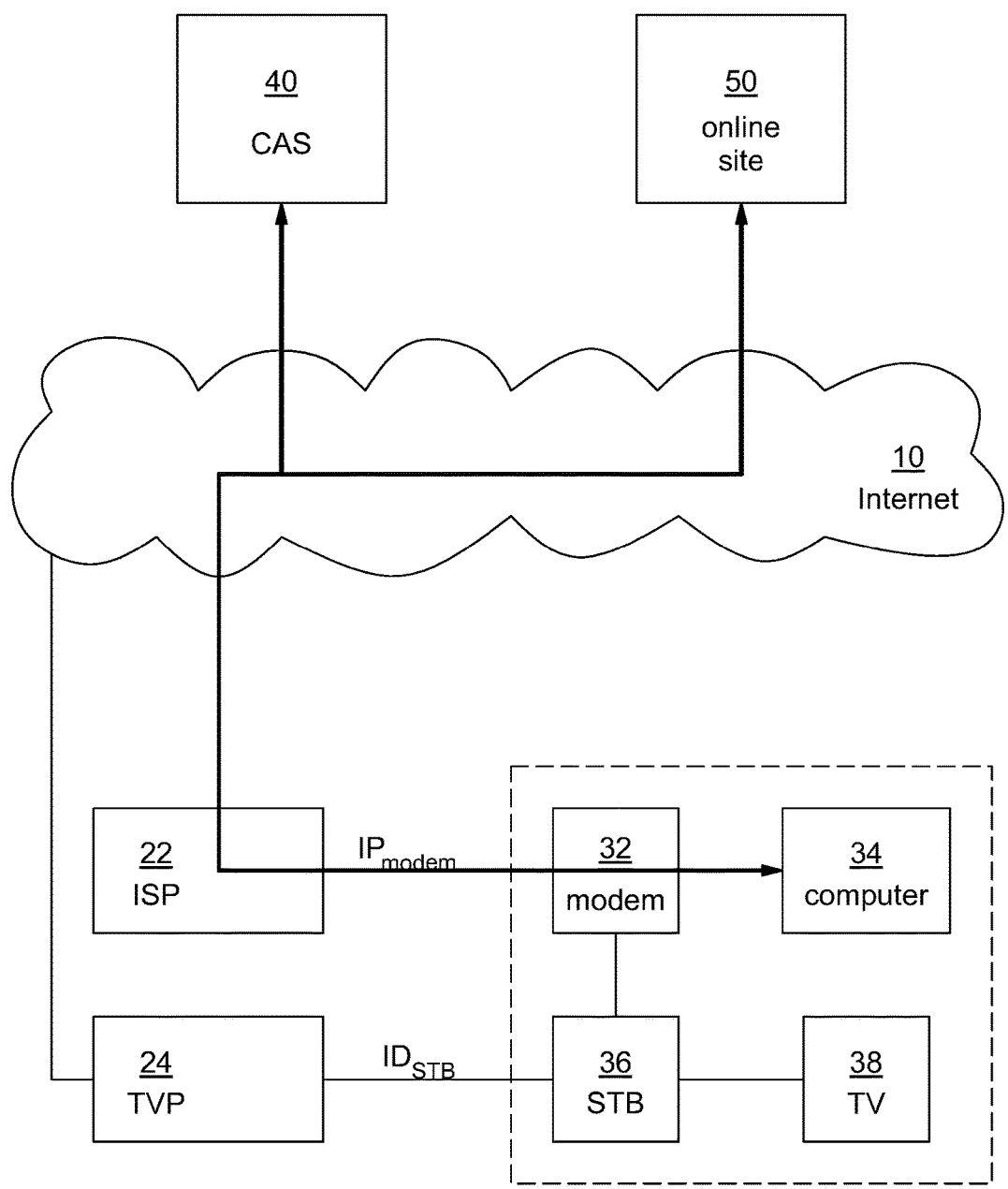
FIG. 1 illustrates schematically exemplary interactions among an online user, an online site, and a central ad server as an online user profile is collected or generated.

The embodiments shown in the figures are exemplary and should not be construed as limiting the scope of the present disclosure or appended claims.

DETAILED DESCRIPTION OF EMBODIMENTS

Some of the terms used in the present disclosure or appended claims are defined as follows.

Television provider (TVP)—an entity that provides television service to a subscriber or user via any suitable transmission medium, including but not limited to coaxial cable, fiber-optical cable, network cable, phone line, satellite transmission, VHF or UHF transmission, other over-the-air transmission, or wireless transmission, e.g., via mobile phone infrastructure.

Internet service provider (ISP; equivalently, an online access provider)—an entity that provides online access to a subscriber or user via any suitable transmission medium, including but not limited to coaxial cable, fiber-optical cable, network cable, phone line, satellite transmission, wireless transmission (e.g., WiMax, WiFi, or other IEEE 802 wireless protocols), or VHF or UHF transmission. The online access enables the subscriber to access the Internet and its myriad online sites, or to access any future network successor to the Internet.

ISP/TVP—in some instances a single entity (or providers controlled by a single entity) can provide to one or more subscribers or users both television service and online access. Such an entity is referred to herein as an ISP/TVP. Although an ISP and a TVP are represented schematically in the drawings by separate labeled boxes, the drawings are intended to encompass implementations in which the ISP and the TVP are independent entities as well as other implementations in which a common ISP/TVP provides both services.

Set-top box (STB)—a device that connects a television and a television signal source. The STB receives an incoming television signal, extracts content from the received signal, and transmits the extracted content to the television to be presented to a viewer. The television signal source can be one or more of a computer network cable (e.g., an Ethernet or other transmission-speed cable), a satellite dish, a coaxial cable connected to a cable television system, a telephone line or digital subscriber line (DSL), a wireless network connection, an antenna (VHF, UHF, digital, or other), or another suitable signal source. The content can include, but is not limited to, video (which often can include an audio portion), audio, Internet web pages, interactive games, or other content. An STB may or may not include a dedicated television tuner. Each STB typically is assigned an identifier of some sort by the corresponding TVP, e.g., to enable the TVP to direct specific signals or programming to a specific STB, to identify the source of requests, commands, queries, or responses received from a particular STB, or for other purposes. In some instances such an STB identifier might be known only to the corresponding TVP and not available for outside communication. If the STB is connected to the Internet as a signal source (directly, through another device, or through the corresponding TVP; connected to the Internet only, or also connected in parallel to another signal source such as a cable television transmission infrastructure), the STB identifier can include an STB IP address (i.e., an Internet Protocol address) or a portion thereof. If the STB is connected to both the Internet and another signal source, the STB identifier can include an identifier specific to the other signal source in addition to the STB IP address. In some instances the STB identifier is static, while in other instances the STB identifier is dynamic and can change from time to time. Sometimes, the STB identifier can involve a STB IP address and other times it can be an identifier used by an infrastructure company (e.g., a cable company) to identify its STBs.

Despite its name, an STB need not be physically located on top of a television set literally. Under current technology, STBs often are located physically adjacent to the television set, such as in a media cabinet or the like, but it is not even necessary that the STB be located in proximity to the television. Nor is it necessary that the STB be a box, literally. Rather, a STB might be implemented, for example, as a circuit board, integrated circuit, set of integrated circuits, or software that is physically integrated with another "box," such as the television, a cable or other connection, a computer, or a building equipment or junction box, which also has other functions, or without being housed in any "box" at all.

Digital video recorder (DVR, alternatively personal video recorder or PVR)—a device that stores video content in a digitally encoded format on a digital storage medium, such as a hard drive, and enables playback of the stored content. A DVR can comprise a stand-alone unit connected to a television, a component of an STB, or a signal source, or the DVR can comprise software that programs a computer to perform DVR storage and playback functions.

Video-on-Demand (VOD)—a system that allows users to select and view video content delivered from a signal source in response to a request from the user. Typically, the requested video content can be viewed at a time of the user's own choosing and can be paused, rewound, or fast-forwarded as desired by the user. A VOD system can "stream" the content (enabling viewing of portions of a requested item of video content while other portions are still being delivered from the signal source), or the VOD system can "download" the content and allow viewing only after a complete item is delivered from the signal source. Some VOD systems allow users to select and watch video content over a network as part of an interactive television system.

Interactive Television (interactive TV, iTV, idTV, or ITV)—any television system that enables a viewer to interact with video content delivered to a television. Interactive television can include, but is not limited to, access to Web sites through TV "crossover links," electronic mail and online chat, online commerce, or enhanced graphics (relative to standard television offerings).

Internet Protocol Television (IPTV)—a system wherein television content is delivered via a computer network using Internet Protocol (IP). For residential users, IPTV is often provided in conjunction with Video on Demand and can also be bundled with Internet services such as Internet access and Voice-over-IP (VoIP). Commercial bundling of TV, VoIP, and Internet access is sometimes referred to in the industry as a "triple play." Additional telecommunications services (e.g., mobile voice or data service) can be added, yielding a "quadruple play" and so forth. IPTV typically is supplied by a broadband service provider using a closed network infrastructure. IPTV also can be provided over the Internet or other publicly accessible computer network, in which case it might be referred to as Internet TV or TV-over-Internet. IPTV also can be used to deliver video or other content over a corporate LAN or other business network.

Online user interface device—any user interface device used to access a remote network such as the Internet, including but not limited to a cell phone or mobile handset, a personal digital assistant (PDA), or a networked computer (desktop, workstation, notebook, laptop, or other).

Online access device—any device used to connect an online user interface device to a remote network such as the Internet, including but not limited to a modem, a wired or wireless router, a wireless access point, a wired network adapter (e.g., Ethernet adapter), a wireless network adapter (e.g., IEEE 802.11, ED-VO, EDGE, HSPA, CDMA, GSM, or other), or an optical fiber based network adapter (e.g., a network interface unit or optical network terminal). Different types of online access devices can be and sometimes are combined into a single unit (e.g., a modem that also functions as a router for a LAN). An online user interface device and an online access device can be, and sometimes are, combined into a single unit (e.g., a computer with a built-in Ethernet adapter, wireless adapter, or modem). Each online access device typically is identified on the Internet by an Internet Protocol address (i.e., an IP address; currently, under IPv4, an IP address comprises a sequence of four numbers each ranging from 0 to 255, i.e., a 32-bit address; eventually, under IPv6, an IP address will comprise a 128-bit address). Every transmission of data over the Internet includes a destination IP address to enable the transmitted data to reach its intended destination. In some instances an online device has a static IP address, while in other, more common instances an online access device has an IP address that is dynamic and changes from time to time. Although IP addresses are referred to herein for enabling data transmitted via the Internet to reach its intended destination, that terminology is intended to encompass any functionally equivalent online access device identifier employed to route such transmitted data to its intended destination through the Internet or through any future successor network. Various examples of online access identifiers are described below, including those that comprise an IP address or a portion thereof.

User (equivalently, subscriber or viewer)—a person receiving online access or television service at a delivery end-point within a household, office, business, or other site or establishment served by an online access provider or television service provider. Multiple users can be located at a single site or establishment. Television ads or programming can be presented on one television set or multiple sets of a given user; likewise, online access or ad delivery can involve one or more computers or other online interface devices of the user. In some instances, a business having multiple physical locations may be served by separate online or television services, but in other instances, a business may have an internal LAN or WAN that extends service provided to multiple physical locations. Also, some computers and televisions are portable and can access the service provided from remote locations. Accordingly, the term "user" is intended to refer to that person who receives the provided services and does not require a fixed or single location in such instances.

User profile—information concerning a specific user of online access or television service. The profile information can be demographic, can be based on observed online or television-related activity or behavior of the user, or can be based on declared information provided by or reported about the user. The profile information can be explicit (e.g., declared or reported) or implicit (e.g., inferred on the basis of other information in the profile). A user profile can be referred to as an online user profile or a television user profile as appropriate if it includes information collected or generated via only one of those media. The user profile can be collected or generated by one or more sources (i.e., profile providers, see below). The user profile can be stored locally on a user's computer or set-top box (e.g., as browser cookies) or remotely on one or more servers, ad servers, or online sites, or at various combinations of those. A single entity can control such multiple locations, or separate entities can control different ones of the locations separately. Various portions of the profile can be linked to or associated with one another in any suitable way, e.g., by each including or referring to a common user name, IP address or other online access identifier, or cookie or tag placed on the user's computer. Whatever the manner and location of storage (local or remote, single location or distributed, single- or multiple-entity control), the totality of the profile information associated with a given user can be referred to collectively as "the user profile."

Behavioral targeting—the delivery of specific advertisements to a user, the advertisements being selected on the basis of activity of the user, typically recent activity, including but not limited to: online or television-based searches conducted by the user; content viewed or otherwise accessed by the user online or on television; online or television advertisements viewed, clicked on, interacted with, or otherwise accessed by the user; shopping or purchases made by the user online or through a television; and any other form of previous user online or television activity.

Central Ad Server (CAS)—a computer server that manages delivery of advertisements (television or online) to visitors of online sites or viewers of television programs. A local ad server can be typically run by a single publisher to serve ads to visitors of websites or viewers of television programs of that publisher, or by a single advertiser to serve ads into ad space acquired by the advertiser on various websites or television programs. A third-party or remote ad server typically is remotely located and delivers advertisements of various advertisers to visitors of websites or viewers of programs of multiple publishers. The remote ad server acts as a central conduit for delivering advertisements, enabling advertisers and publishers to track the distribution of their online or television advertisements and to control the rotation and distribution of their advertisements across the Internet or television system from one location. The advertisements can be stored on the CAS for later delivery, can be transmitted to the CAS and then delivered from the CAS upon receiving an ad request, or can be delivered from another source in response to an ad request received and routed by the CAS. Examples of third-party ad servers include DoubleClick's DART for Publishers central ad server (also known as DFP) and DoubleClick's DART for Advertisers central ad server (also known as DFA). In some cases, a CAS can be owned or used by a TVP, an ISP, an STB provider or modem provider, an online content provider, a profile aggregator, a profile distributor, an ad broker, an ad network, an ad exchange, an ad agency, an online advertiser, a media buying firm, a TV advertiser, a TV ad space owner, or a TV content provider, representatives or proxies of any of those entities, or other entities. In some instances, the CAS will operate independently of an ISP or TVP.

Profile provider—an entity that has or collects profile information that is used to target advertisements. In the context here, the profile provider typically cooperates with a CAS, which receives all or part of the profile information from the profile provider for use in targeting television or online advertisements. User profile information derived from online or television activity can include, for example, observed online behavior of a user accessing the Internet (e.g., viewed online content viewed or accessed, online searches performed, online purchases made, or times and dates of such behavior), observed viewing or interaction behavior of a television viewer (e.g., television programs or ads viewed, responses to interactive programs or advertisements, or times and dates of such behavior), or demographic information collected from an Internet user or television viewer.

Examples of profile providers can include, but are not limited to, any entity that owns or uses: (1) a visited Internet site server; (2) a server delivering content, images, audio, video, text, or any combination directed to an online user interface device (such as a computer or other online interface device) via an online access device (such as a modem or router), either directly or indirectly (e.g., via a redirect); (3) a server delivering content, images, audio, video, text, or any combination directed to a television via a set-top box; (4) an ad server delivering an ad to an online user interface device via an online access device; (5) an ad server delivering a television ad to a television via a set-top box; (6) a server recording an activity conducted from an online user interface device such as a click on an ad or a link to an ad, a viewing of an ad, a click on a link to particular content, a search, a request for product information, receipt of particular content, a product purchase, a telephone call made, or any other selected and definable user activity; (7) a server recording an activity conducted through a user's television such as a click on an ad or a link to an ad, a viewing of an ad, a click on a link to particular content, a request for product information, receipt of particular content, a product purchase, or any other selected and definable user activity; or (8) a server facilitating instant messages or any other kind of communication on behalf of the user.

Another example of a profile provider is: (9) a company sponsoring and having access to a program located on the user's computer or other online user interface device or on the user's set-top box that can observe the user's online or television activity (with the user's permission), such as a browser toolbar or desktop search software. A profile provider, broadly, can be: (10) any entity (including an ISP, TVP, or ISP/TVP) able to collect behavioral profiles (observed online activity or observed viewing or viewing-related activity) or demographic profiles (provided by the user), typically including a device identifier (e.g., a set-top box identifier or an online access identifier) used when the profile was observed or collected and the date and time the profile was observed or collected, regardless of whether or not the entity collected a given profile directly through contact with the user's computer or television or indirectly from another entity such as those listed in this or the previous paragraph. In some cases, a user's online or viewing activity will result in direct contact between the television (via a set-top box) or the online user interface device (via an online access device) and the profile provider, e.g., if the profile provider is an online commerce site, the user makes a purchase at the site, and the online commerce site generates a profile for that user. In other instances there may be no direct contact between the profile provider and the user, e.g., if the user makes a purchase at an online commerce site that in turn reports information pertaining to the user to the profile provider. In some situations, also, a profile provider might also own or otherwise control a CAS, in which case user profiles can be immediately available to the CAS without need for transmission between separate entities.

Profiles or partial profiles provided by a profile provider to a CAS can contain any quantity of profile information, such as, in one example, just an online access IP address or set-top box IP address or other STB identifier used by a person at the time his profile was collected and the identity of the profile provider. The profile can include, e.g., a profile identifier or profile name, a username, or a login ID; the profile can be referenced by or included in a cookie or tag placed on a user's STB or online user interface device. The IP address can be provided by the profile provider itself or might be obtained by the CAS when a user engages in any online or television activity or provides an item of demographic information and is redirected by a profile provider to the CAS. Multiple set-top box identifiers or online access identifiers (such as IP addresses) can be associated with a single user profile if those identifiers change over time. In another example, a profile can be more extensive and can include demographic or behavioral information, such as an extensive browsing history, shopping or purchase histories, content or programs viewed, and other information concerning the user's characteristics or the user's activities. In some instances a profile includes PII; in other instances it does not. Although the profile provider is an entity, many or most of the actions attributed to the profile provider are actually performed by equipment under the administrative control of the profile provider, such as computers, servers, software running on those computers or servers, network connection hardware or software, or other equipment. Such actions may still be characterized as being performed "by the profile provider," whether performed automatically, semi-automatically, or manually.

Personally Identifiable Information (PII)—information that can be used to identify a specific person, including but not limited to: name, Social Security number (SSN), date of birth, street address, email address, static IP address (if any), phone number (home, work, wireless), financial account numbers (bank accounts, credit accounts, or any other financial data), driver's license number, vehicle registration number, vehicle license number, facial photographs, fingerprints, handwriting or signature, or any other information that can assist in identifying a specific person.

Non-Personally Identifiable Information (non-PII)—information about a person that typically cannot be used to specifically identify that person, including but not limited to: city, state, or country of residence, age, gender, race, ethnicity, school or workplace (if sufficiently large), salary or income, hobbies, dynamically assigned IP addresses, online sites visited, online searches conducted, or other information that is useful to know about a person but does not by itself allow one knowing the information to identify the particular person.

Cookie—a text file placed on a user's computer by a server that also serves content to the user's computer using browser software. The cookie typically can be read or altered only by a server operating under the same Internet domain as the server that originally placed the cookie. The cookie file can be used to identify a computer that has already been in contact with the same domain and can also be used to store PII or non-PII pertaining to a user of that computer. In a first example, a cookie can store non-PII such as previous searches conducted at the site, or pages viewed or visited at the site, by the computer user. In a second example, a cookie can be used to store a username used by the user to access a site, customized preferences of the user, or various pieces of PII. A cookie file can also be created, altered, or deleted by software located on the user's computer.

Television advertisement (TV ad)—a full screen video ad, a partial screen video ad, a banner ad, a text ad, an audio ad, or any other form of advertisement suitable for delivery to and visual or audible presentation by a television set.

As illustrated schematically in FIG. 1, an online user accesses the Internet 10 via the user's Internet service provider (ISP) 22 using computer 34 and modem 32. As the user engages in various online activity, an online user profile is collected or generated by one or more profile providers (e.g., the owner or controller of central ad server (CAS) 40 or online site 50). That online user profile can include demographic information concerning the user, can include information concerning the user's online behavior, or can include information declared online by or about the user. These categories of profile information can overlap.

Examples of demographic information may include but are not limited to: age, gender, race, ethnicity, religion, educational level, income, debt level, credit report entries, job or profession, employment status, employer, marital status, parental status, home owner or renter, or geographic location. Examples of behavioral information may include but are not limited to: online content viewed or accessed, online searches performed, online purchases made, or times and dates of such behaviors. Examples of declared information may include but are not limited to a user's declared interest in a hobby, social or leisure activity, vocation or avocation, or particular subject area. The profile can contain personally identifiable information, or not.

Information in the online user profile can be obtained or generated by soliciting information from the user, by tracking or recording online activity of the user, or by inference based on solicited, tracked, or recorded information.

Online user profile information can be stored locally on a user's computer (e.g., as cookies) or remotely (e.g., on one or more servers, ad servers, or online sites). In some instances the entire online user profile can be stored at a single location, and in other instances online user profile information can be distributed over multiple locations. A single entity can control such multiple locations, or separate entities can control different ones of the locations separately.

The information from the online user profile can be used to select targeted television advertisements for presentation to the online user while that user watches television.

Figure 2:
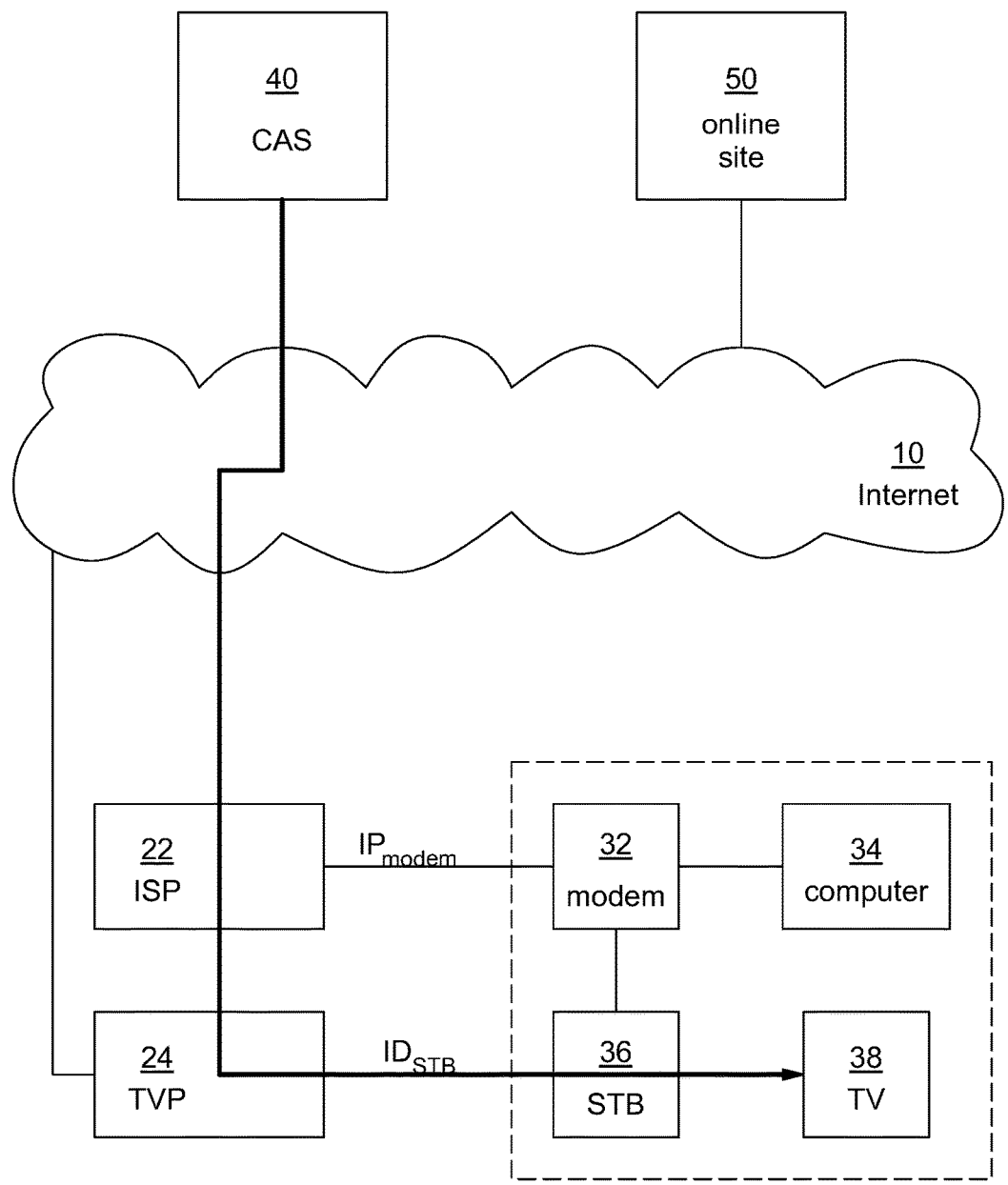
FIG. 2 illustrates schematically exemplary transmission of a targeted television advertisement to a user's set-top box (STB).

An association between the online user profile and a corresponding set-top box (by which the user receives any suitable type of television service, e.g., cable, IPTV, VOD) is required to enable delivery or transmission of the targeted television advertisement to a television at the user's location (as in FIG. 2). Such an association can be established or provided in any suitable way, including those disclosed in the above-referenced, incorporated applications Ser. Nos. 11/736,544 and 11/968,117.

In one example, the online user profile and the set-top box identifier are associated by each being associated with the same corresponding online access identifier (e.g., an IP address, or a portion thereof, of a modem, network adapter, router, or other online access device or user interface device). In one implementation, the online access identifier and the set-top box identifier can be associated by the online access identifier being referenced or included in the online user profile. In another implementation, the online access identifier and the first set-top box identifier can be associated in a database. The online user profile and the set-top box identifier can be associated with or without employing personally identifiable information concerning the user, as needed, desired, or required.

In another example, the online user profile originates at least partly from an online user interface device (e.g., a computer), and the online user profile and the set-top box identifier are associated by the set-top box and the online user interface device being connected to a common local area network (LAN). In one such arrangement, an online access identifier corresponding to the set-top box and an online access identifier corresponding to the user interface device are the same (e.g., the 32-bit IP address of a modem that connects the LAN to the Internet in accordance with IPv4; as shown in FIGS. 1 and 2). In another such arrangement, the online access identifier corresponding to the set-top box and the online access identifier corresponding to the user interface device share a common portion of their respective online access identifiers (e.g., they share the first 64 bits of their respective 128-bit IP addresses used in accordance with IPv6). Other such common-LAN arrangements can be employed. Although a connection between modem 32 and STB 36 is shown in FIGS. 1 and 2, such a connection need not be present in every implementation, including those described in the previous paragraph.

The targeted television advertisement can be delivered or transmitted to the user's set-top box (STB) 36 from any suitable entity (e.g., from CAS 40 via TVP 24 as FIG. 2 illustrates, from CAS 40 via ISP 22, from online site 50, or from another server, ad server, or online site). The entity selecting the targeted television advertisement can present or arrange for the presentation of the advertisement, or cause another entity to present or arrange for the presentation of the advertisement. Those actions can include transmitting the selected television advertisement, transmitting a title or other identifier of the selected television advertisement, redirecting the online user to an ad server, or transmitting instructions for or other information used for identifying, locating, or presenting the selected television advertisement.

The targeted television advertisement can be delivered or transmitted to STB 32 at the time it is to be presented, or it can be delivered or transmitted in advance of display and stored in STB 32 or in a digital video recorder (DVR; not shown). The targeted television advertisement is presented via STB 32 on television 38 or other suitable television display device.

It is desirable to increase the likelihood that the targeted television advertisement is presented at a time when the user, specifically the same person whose online user profile caused the targeted television advertisement to be selected, is watching television. A television advertisement targeted based on an online user profile of a first user is more likely to be wasted or ineffective if presented while a different, second user is watching television.

The likelihood of presenting the targeted television advertisement while the intended target (i.e., user) is watching television can be increased by presenting the targeted television advertisement in association with a particular television program or channel that, like the targeted advertisement, is selected based at least in part on information from the online user profile or is otherwise related to the information in that profile. The user is more likely to see a television advertisement targeted at that user (based on that user's online profile) if presented in association with a television program or channel also selected on the basis of or otherwise related to that user's profile.

Any type of information in the online user profile can be considered to identify a relationship between the profile and a television program or channel for delivering the targeted television advertisement, including examples given above. As already stated, the information from the online user profile that is used to select the television program or to relate the online user profile to the television program can be demographic, behavioral (i.e., based on observed online activity), declared by or about the user, or any combination of two or more of those types of profile information.

Specific examples of a relationship, between an online user profile and a television program or channel, that is identified based on information in that profile can include, but are not limited to:

(1) identifying a relationship between a travel program or travel channel and an online user profile that includes a history of the user having visited online travel sites;

(2) selecting a sports program, televised sporting event, or sports channel if the online user profile includes information concerning tickets to a sporting event that the user has purchased online;

(3) selecting a music program, televised concert, or music channel (perhaps genre-specific) if the online user profile indicates that the user has purchased (online) or downloaded music;

(4) relating a television program about weddings to an online user profile that includes registration information for an online bridal registry or includes information concerning visits to wedding-related online sites or content;

(5) selecting a financial news program or channel if the online user profile includes registration information for an online brokerage, includes a history of viewing online financial news, or includes information concerning online access to a personal stock portfolio page;

(6) selecting a real estate program or channel if the online user profile includes online search information for homes for sale;

(7) selecting a television news program or channel if the online user profile includes subscription information for an online edition of a newspaper or includes a history of viewing newspaper content online;

(8) identifying a relationship between a television program focusing on health issues and an online user profile that includes information indicating the user's viewing of health-related content online;

(9) selecting a sport's program if information in the online user profile indicates that the user is a 28-year-old male;

(10) selecting a daytime soap opera if information in the online user profile indicates that the user is a 33-year-old stay-at-home mother;

(11) relating a classic, black-and-white movie to an online user profile that indicates that the user is above age 70;

(12) selecting a television program focusing on horses or other animals if the online user profile includes an indication that "horse-back riding" is listed as a hobby of the user on a social networking online site; or

(13) relating a country music program to an online user profile indicating that the user is a registered member of an online forum for square dancing.

In the first eight examples, the television program is related to or selected based on behavioral information from the online user profile; in the next three examples, the television program is related to or selected based on demographic information from the online user profile; in the last two examples, the television program is related to or selected based on user interests declared online.

The examples given are intended to represent examples of types of relationships, in various classes of attributes or characteristics, rather than specific cut-offs. For example, the ages are selected arbitrarily and could be changed to different specific ages or age ranges, and the example interests and hobbies are arbitrary and not central to the point being made. The same is true for examples given elsewhere herein.

Whatever information from the online user profile is employed, that information can be used to identify a relationship between the online profile and a particular television program or channel that is suitable for presenting a targeted television advertisement to the user. The flow diagram of FIG. 3A illustrates one example of such a process schematically; the order of steps is illustrative and can vary as needed or desired.

Both the targeted television advertisement and the television show are selected based on information in an online user profile and presented via a set-top box associated with that online profile. An exemplary variation of that process is illustrated in FIG. 3B. A relationship is identified between a television program watched via a set-top box and an online user profile associated with the set-top box. On the basis of information in that online user profile, a targeted television ad is selected and presented via the set-top box, in association with presentation of the related television program. In either case (and in other examples), the targeted television advertisement can be presented automatically in association with presentation (via the user's set-top box) of the television program or channel selected based on or otherwise related to the online user profile.

Figure 3A:
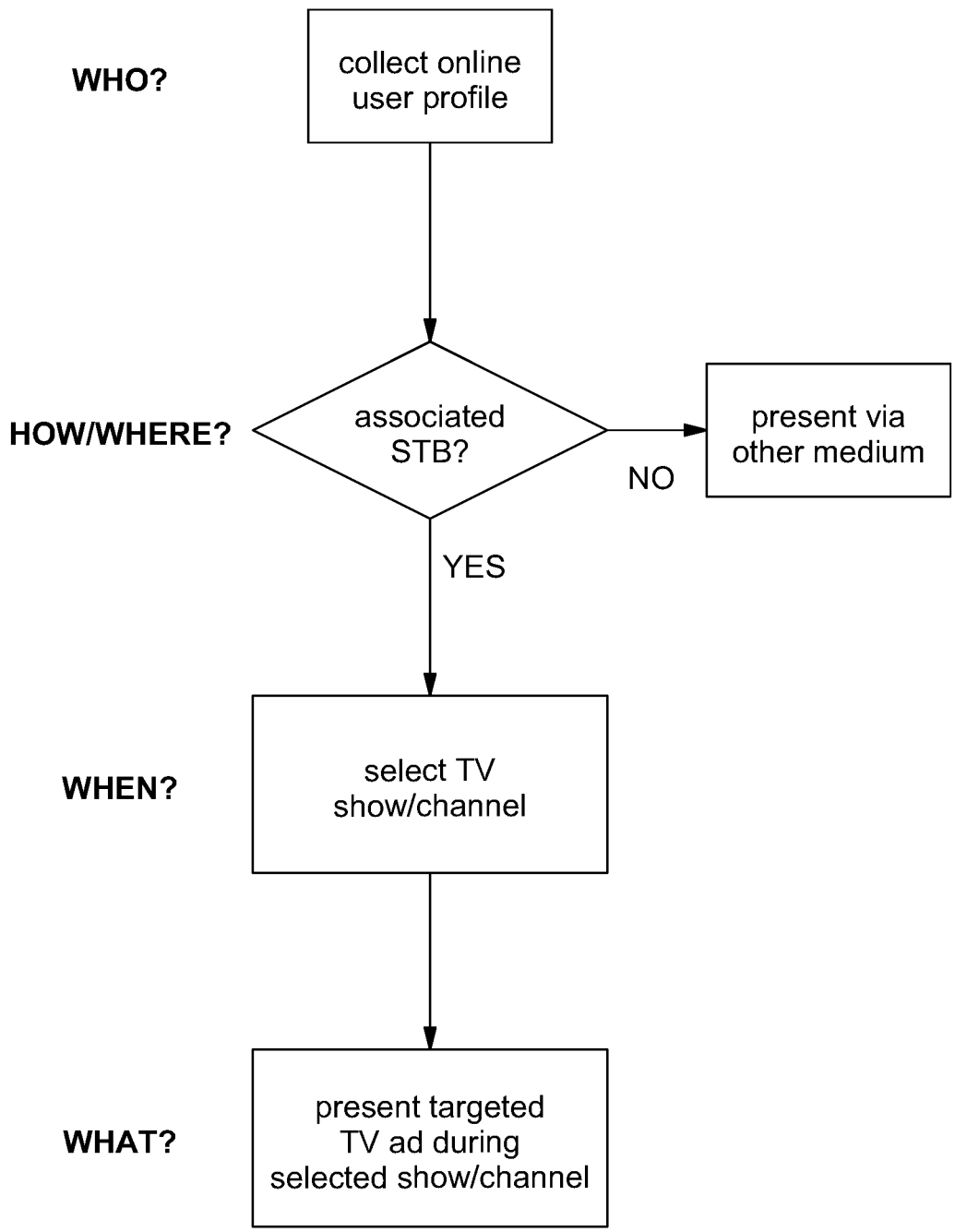
FIGS. 3A and 3B illustrate schematically exemplary processes for presenting a targeted television advertisement during a selected television program or on a selected television channel.
Figure 3B:
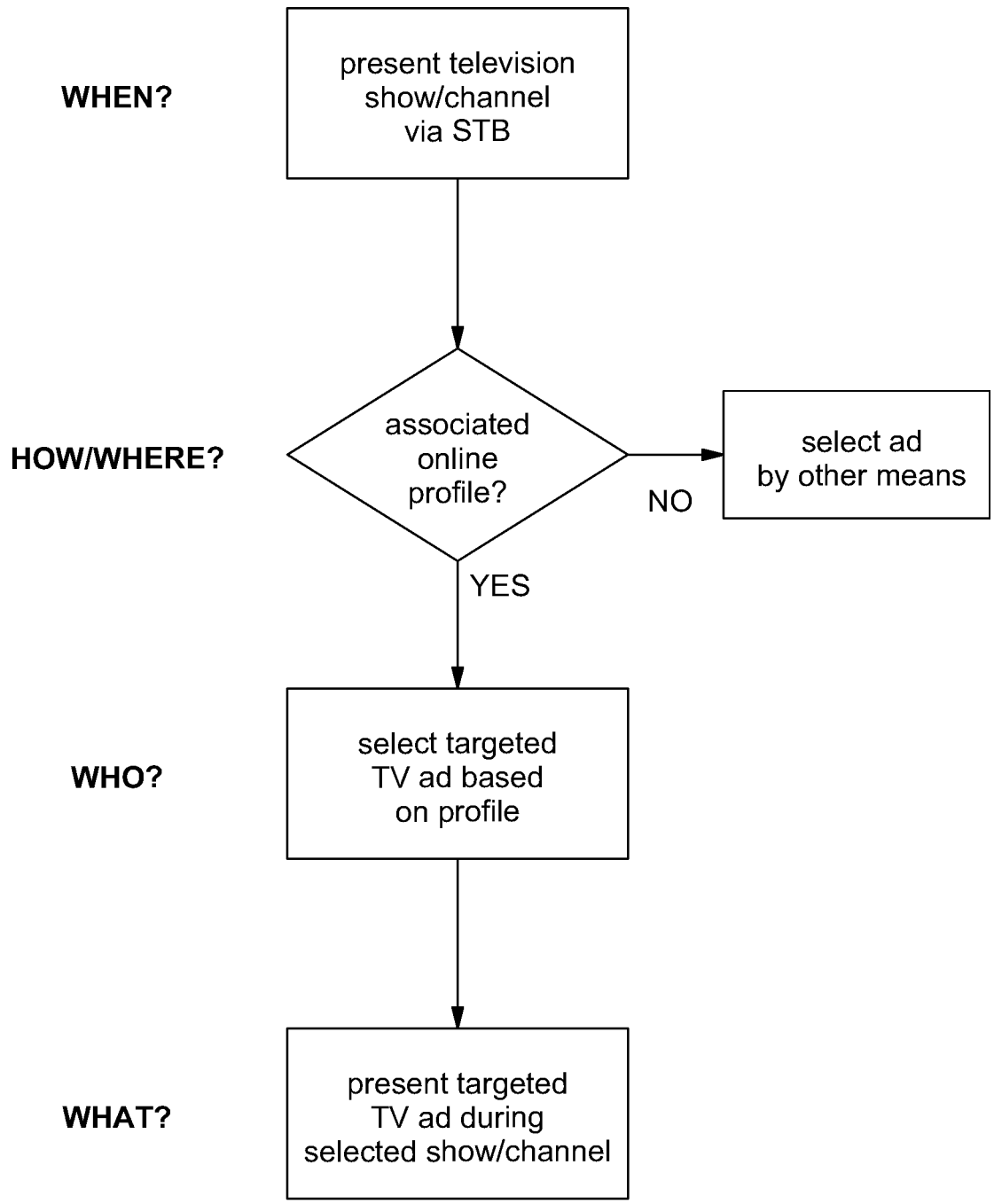

In an exemplary implementation, the television programs viewed via the user's set-top box (during broadcast, unicast, or recorded playback; via cable, IPTV, VOD, Internet-based source, or other suitable source) can be monitored, and a program that has been selected as shown in FIG. 3A (i.e., based on an online profile associated with the set-top box) can be recognized. Such monitoring can be done locally by the set-top box, remotely by a server to which the set-top box reports its activity, remotely by a server delivering the television program to the set-top box, or by other suitable arrangements.

Once a selected program is thus recognized, the targeted television advertisement, either selected in advance or in real-time, can be inserted into the recognized, selected television program by the server delivering the program, by the set-top box, or by another server structured and connected for that purpose.

In another exemplary implementation, as shown in FIG. 3B, relationships can be identified between each of one, a few, many, or all television programs watched via the set-top box and a corresponding one of multiple online user profiles associated with the set-top box, based on the nature of each program and information in the multiple online profiles. Targeted television advertisements selected based on information in each online profile can be presented in association with each television program thus matched with (i.e., related to) a corresponding profile.

The information from the online user profile that is used to select a targeted advertisement can, but need not, bear any correlation or connection with the information from the online user profile that is related to the television program (aside from arising from an online profile of the same user).

Moreover, the ad selections and program relationships can be based on profile information of the same type (e.g., both demographic, both behavioral, or both declared) or of differing types (e.g., one demographic and the other behavioral) of online user profile information. In an example wherein the ad selection and program relationship are correlated with one another, a sports highlight program can be selected for presenting a television advertisement for baseball memorabilia, with both the program relationship and the ad selection being based on the user's earlier online search for the Baseball Hall of Fame. In an example wherein the ad selection and program relationship are not connected (except by arising from the same profile), a cooking show can be identified as related to the user's earlier online search for recipes, and an ad for cosmetics, selected based on the user being a 40-year-old female with household income greater than $80,000/year, can be presented with that related cooking show.

In one example, a first user searches for car insurance online, and the corresponding online user profile also indicates that the user is a 23-year-old male with one year of college who makes $18,000/year. An exemplary method allows presentation via that first user's set-top box of a television advertisement for car insurance (selected based on the first user's online behavior) during an episode of "The Real World" on MTV (selected based on the first user's demographic information). Under the same exemplary method, a second user that is 23 years old and male, has one year of college, and makes $18,000/year, but who browsed for a particular travel destination at an online travel site, can receive a television advertisement touting flights to, or hotels at, the destination (selected based on the second user's online behavior, which differs from the first user's online behavior), also presented during an episode of "The Real World" (selected based on the second user's demographic information, which happens to match the first user's demographic information) shown via the second user's set-top box.

In another example, a first user searches online for tickets to concert featuring 80's-era rock bands, and the corresponding online user profile also indicates that the user is a 45-year-old male, has a doctorate, and makes $170,000/year. An exemplary method allows presentation via that first user's set-top box of a television advertisement for genre-specific music compilations (selected based on the first user's online behavior) during television programs on "Discovery Channel" or "BBC America" (identified as being related to the first user's demographic information). If it so happens that a second user searches online for the same concert tickets, but the corresponding second online user profile indicates that the second user is a 37-year-old female with an associate degree and annual income of $32,000, under the same exemplary method, the same advertisement for music compilations (selected based on the second user's online behavior, which in this respect happens to match the first user's online behavior) can be presented during episodes of "Survivor" (identified as being related to the second user's different demographic information) shown via the second user's set-top box.

In another example, a first user searches online for automobiles and (not necessarily during the same online session) purchases several mystery novels from an online bookseller. A second user at the same household (or other common physical location) browses a medical information site (probably at a different time than the first user's search) and browses one or more online sites concerning Civil War battlefields (not necessarily during the same online session as when the second user browsed the medical information site).

Those two users can have distinct online user profiles through use of different computers or through use of different user accounts or user IDs on the same computer. If two users in a single household (or other single physical location) share a common online access IP address or other similar online access identifier (e.g., by sharing a computer, modem, or router), their profiles can nevertheless be distinct and can be distinguished by different profile identifiers (e.g., different browser cookies, one of which is associated with each profile). If the two users have differing online access identifiers (e.g., differing IP addresses or portions thereof in an IPv6 implementation), their respective profiles can be distinguished by differing profile identifiers or by the differing online access identifiers.

On the basis of those distinct profiles (that are both associated with the set-top box identifier), an exemplary method can cause presentation of (a) a television advertisement for automobiles during replay of an episode of "CSI" or other similar crime drama (both selected based on the first user's online profile) via the set-top box, and (b) a television advertisement for a health insurance plan during replay of "History Channel" programs (both selected based on the second user's online profile) via the same set-top box (or a different set-top box but also located at the users' common physical location and also associated with the online user profiles).

In another example, one online user profile associated with a set-top box corresponds to a 47-year-old woman who (1) regularly visits the New York Times online site and does the daily crossword, (2) shops online for shoes, and (3) joined an online discussion group for yoga. A second online user profile in the same household corresponds to a 19-year-old male who (4) regularly visits online video gaming sites and (5) joined an online fan club for a heavy-metal band. If the set-top box in the household (and associated with both online profiles) detects viewing of a game show such as "Jeopardy," a targeted television ad is presented for shoes or for a yoga class, because "Jeopardy" is related to, and the ads are chosen based on, information in the first online user profile. If the set-top box detects viewing of music videos on MTV, on the other hand, a targeted television ad is presented for computer equipment or video gaming software, because the MTV channel is related to, and the different ads are selected based on, information in the second online user profile.

Identification of a relationship between a television program and an online user profile can be done in real time as each television program is watched, or can be done ahead of time. If done ahead of time, such matching (i.e., identification of a relationship) can be done between each profile associated with the set-top box and (a) all programs in all TV channels included in the TV service to which the user has subscribed, or (b) only those programs selected based on a history of programs watched previously via the set-top box (with such a history recorded over any desired time period or refreshed at any desired time interval).

Matching of television programs and online user profiles can be performed locally by the set-top box or can be performed by a remote server structured and connected for that purpose (perhaps a server that also delivers the television program or television advertisements to the set-top box). The information pertaining to the matching of television programs and online user profiles can be stored locally on the set-top box or can be stored on a remote server structured and connected for that purpose (perhaps a server that also delivers the television program or television advertisements to the set-top box).

Every program watched can be matched to an online user profile associated with the set-top box, or only those programs for which a sufficiently well matched online profile is associated with the set-top box. Each matched program can be matched to only a single online user profile associated with a given set-top box, or can be matched to multiple sufficiently well matched profiles associated with that set-top box. Any suitable quantitative or qualitative criteria can be employed for determining when a television program and an online user profile are "sufficiently well matched."

In one exemplary implementation, television programs can be analyzed to identify their characteristics (e.g., their themes, keywords, or categories) as well as average characteristics of the programs' viewing populations (e.g., demographics, hobbies, or interests), to permit better matching of a given television program to an online profile according to common variants (if any) in the online profile and either the television program characteristics or the average characteristics of the television program's viewers.

For example, suppose an online profile of a given user identifies that user as a 70-year-old female who likes professional wrestling (identified as such on the basis of her frequent online reading of news about professional wrestling competitions). A TV wrestling program has average demographics of mainly males between the ages of 18 and 34 and some females between the ages of 25 and 40. Despite the fact that the average demographics of the wrestling program do not match the individual demographics of the online user profile, the matching of the wrestling program's main topic (i.e., "wrestling") with the first user's interest (i.e., also "wrestling"), in this implementation, would suffice nevertheless to select the TV wrestling program for delivery of a targeted TV ad to the computer user (i.e., the 70-year-old female).

In an extended exemplary implementation, a TV program is described or categorized, not only on the basis of one or several topics included in the program, but also on the basis of each individual scene or segment that constitutes the program.

Such a breakdown increases the likelihood of recognizing the correct TV viewer based on an online profile, if the advertisement is presented during or adjacent the time a specific scene or segment is presented on the TV screen. For example, the half-time show of the Super Bowl may draw different types of viewers than the first quarter of the game, which may in turn draw different types of viewers than the fourth quarter of the game. The extended implementation described in this paragraph permits different choices of television advertisements within different scenes or segments of a given television program based on the matching level of online user profiles associated with the STB and the characteristics of different scenes or segments of the TV program.

As illustrated in the foregoing examples, the television advertisement selected for targeted presentation based on information in the online user profile may or may not be directly related to the profile information. In different cases, the relationship between the profile and the selected ad may be direct (e.g., search online for a particular concert ticket, get targeted television ads for that concert), indirect (e.g., browse online at the Disney site, get targeted television ads for Anaheim hotels), generally behavioral (e.g., browse online at a hunting site, get targeted television ads for beer), or strictly demographic (e.g., be a 50-year-old woman, get targeted television ads for anti-wrinkle cream). Similarly, the relationship identified between the profile and the television program or channel may be direct (e.g., browse online at the Disney site, get targeted television ads during a Disney program or on the Disney channel), indirect (e.g., search online for a particular concert ticket, get targeted television ads during a music program of the same genre), generally behavioral (e.g., shop online for power tools, get targeted television ads during a NASCAR telecast), or strictly demographic (e.g., be a 25-year-old woman, get targeted television ads during "The Gilmore Girls").

The disclosed systems and methods also provide opportunities for delivering targeted television ads that might be considered "counterintuitive." For example, a 70-year-old retired concert pianist who searches online for tickets to a professional wrestling event can be presented with ads for classical music performances or recordings during episodes of "WWE Raw" shown via her set-top box—an advertising opportunity that would not be typically utilized or even considered using more traditional advertising models.

The foregoing examples illustrate a departure from more conventional advertising models. As illustrated schematically in FIG. 6A, conventional manual selection of advertisements typically begins with a television advertisement and an average demographic profile of a population of viewers for which the television ad is intended. A television program is then selected for presenting the ad based on an average demographic profile of a population of viewers watching the program.

Figures 6A, 6B:
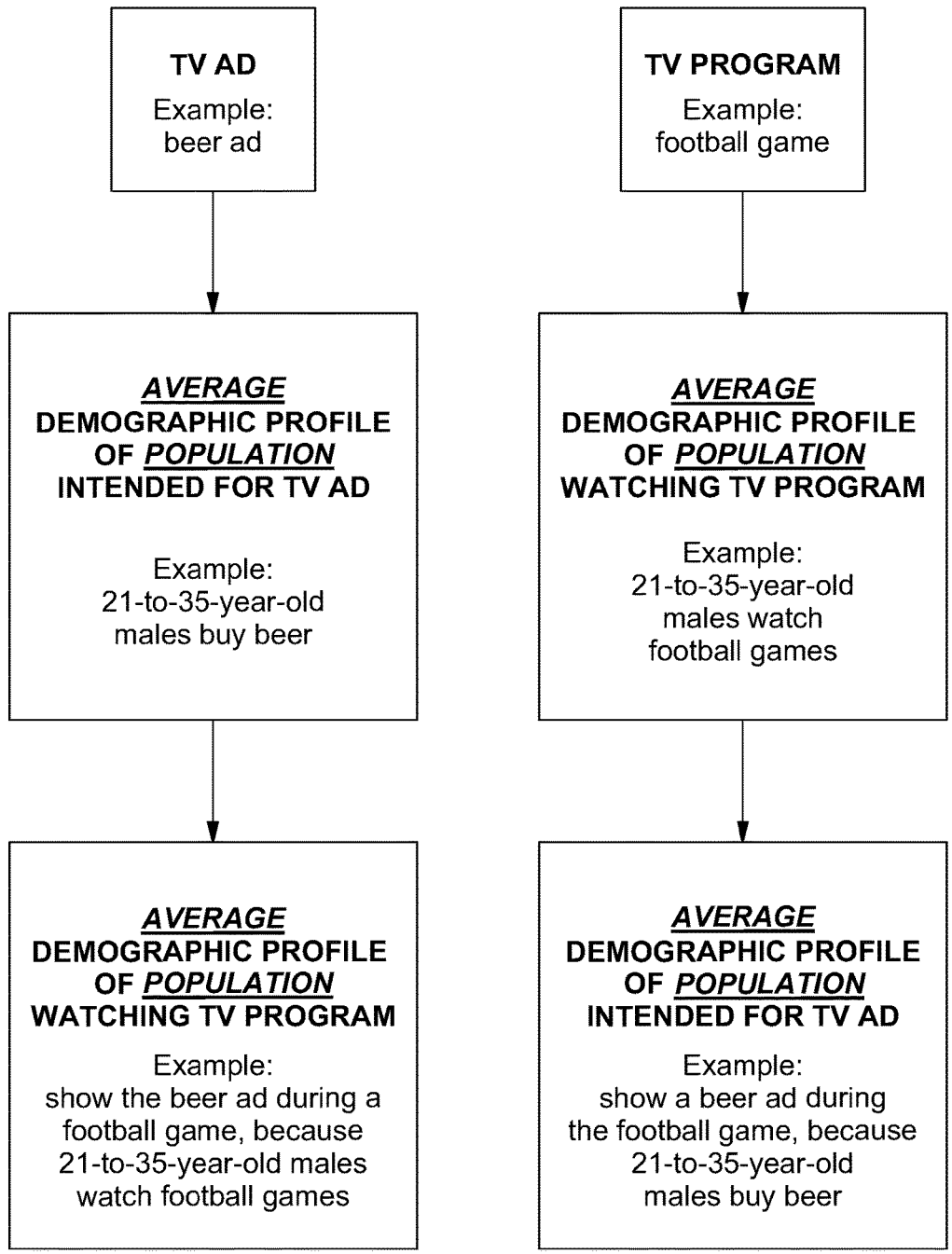
FIGS. 6A and 6B illustrate schematically conventional advertising models.

Alternatively, as illustrated schematically in FIG. 6B, conventional manual selection of advertisements might in some instances begin with a television program and an average demographic profile of viewers of that program. A television advertisement is selected for presentation with the program based on an average demographic profile of a population of viewers for which the television ad is intended. In either case, the demographic information (i.e., the average demographic profiles) applies to populations of viewers and serves only as an intermediate link between a television ad and a television program with which it is presented.

Figure 7:
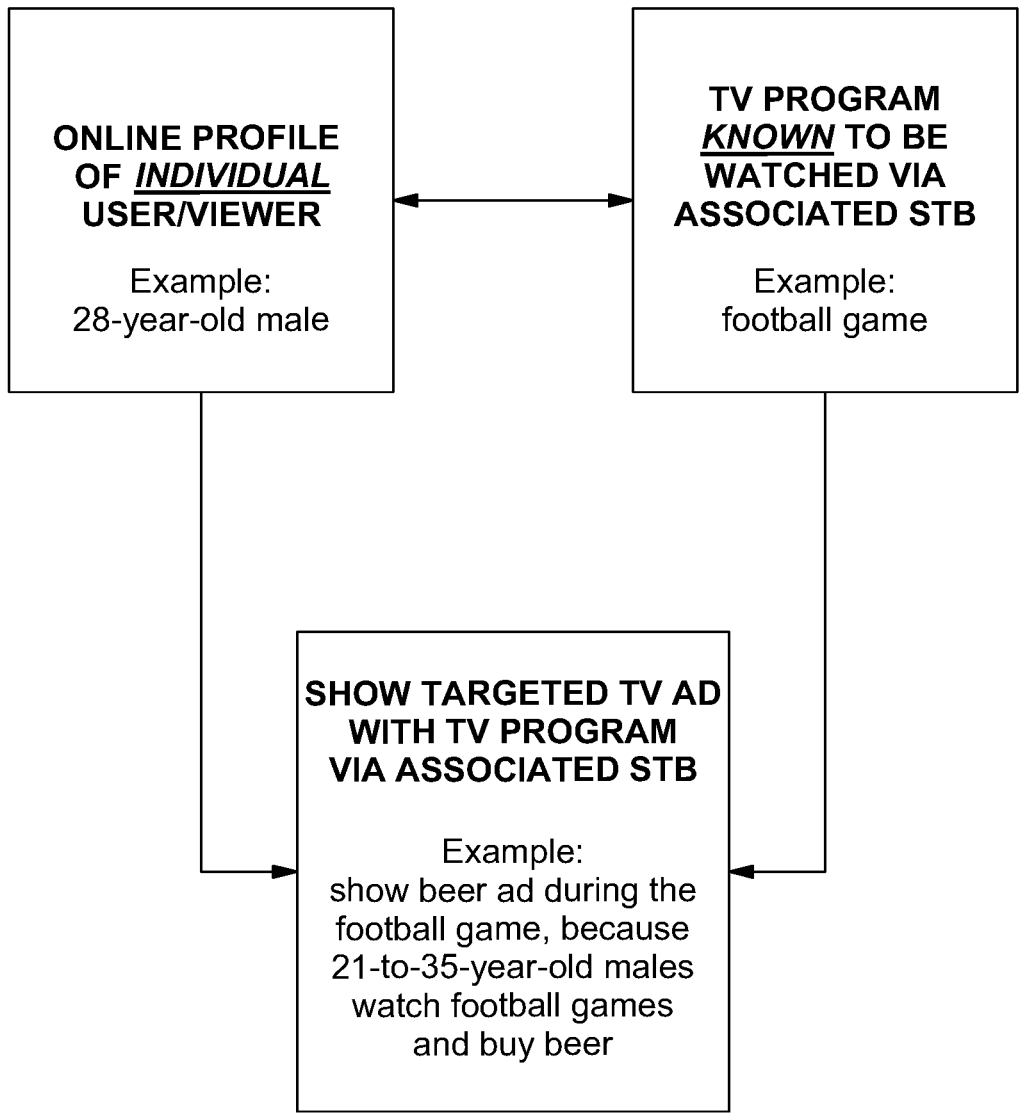
FIG. 7 illustrates schematically an exemplary advertising model.

In sharp contrast, the examples disclosed herein make use of (a) an online profile of an individual user/viewer, and (b) identification of a relationship between a television program and the online profile, which related television program is known to be watched at some given time via an STB associated with the profile of the individual user (illustrated schematically in FIG. 7). A targeted television advertisement is selected on the basis of the online profile and presented with the television program (that is related to the profile) via the associated STB. As indicated by the double-headed arrow in FIG. 7, either the online profile or the television program can serve as the starting point, when looking to identify a relationship on the basis of information in the online profile.

Presentation of a targeted television advertisement in association with the television program or channel that is related to the online user profile can be achieved in a variety of ways. In one example, targeted television advertisement 104 can be shown temporally interleaved with the related television program 102 (FIG. 4A) or immediately before or immediately after the related television program 102 (FIGS. 4B and 4C), or it can be shown spatially combined with the related television program 102 on television screen 99 (e.g., overlaid as in FIGS. 5A and 5B or juxtaposed as in FIGS. 5C-5E). The related television program 102 may or may not also include other temporally interleaved or spatially combined advertisements (not shown). The selected television advertisement can presented during a latter portion of a television program immediately preceding the related program or during an initial portion of a television program immediately following the related program. In any of those examples, the targeted television advertisement can be presented immediately before, during, or immediately after broadcast presentation of the related television program, or immediately before, during, or immediately after delayed presentation of the related television program (e.g., by recording and later viewing with a DVR or via a video-on-demand system).

If the ad server elects to present a targeted television advertisement in association with a television channel related to, or selected on the basis of, an online user profile (as opposed to a program so selected or related), then the targeted advertisement can be shown, in accordance with different embodiments, (a) during any program shown on the selected or related channel or (b) during only certain programs on that channel, in any of the ways described above.

In another example of presenting the selected television advertisement "in association with" a television program initially selected based on or otherwise related to an online profile, the television program can be employed as an "anchor" or starting point for identifying relationships between the online profile and other, different television programs. This can be done, for example, by monitoring television-viewing behavior via the set-top box during presentation of a selected or otherwise related program. In an exemplary implementation, during presentation of an initially selected program via the set-top box, repeated channel switching between that first program and a second, different program is detected. A relationship between the online profile and the second program can be identified based on the observed channel-switching behavior during the first program, and targeted ads selected based on the online profile can be presented with the second program.

In another exemplary implementation, consultation (perhaps repeated) of an online program guide during the first program to view entries for a second, different program can be detected, a relationship between the online profile and the second program can be identified on that basis, and a targeted ad selected based on the online profile can be presented with the second program.

In either of those examples, to increase the odds that the interest in the second program is exhibited by the same user whose online profile indicated interest in the first TV program (as opposed to another person that joined the first user to watch the first TV program), characteristics of the second program and average characteristics of viewers of the second program can be compared to the online profile to identify a sufficient match. Other examples of a first program related to an online profile being used to identify relationships between other programs and the online profile, based on observed television-viewing behavior during the first related program, can be implemented.

The examples discussed above, although somewhat numerous, describe only a few examples of the disclosed systems and methods, and it is recognized that various of the specifically discussed embodiments fall with broad categories of embodiments involving a targeted television advertisement being (a) selected based on behavioral, demographic, or declared information in an online user profile, and (b) presented in association with a television program or a television channel related to, or selected based on, behavioral, demographic, or declared information in that online user profile. Myriad other examples, cases, and variations exist within the scope of such broader disclosed classes of embodiments, despite all such examples not having being specifically set forth herein.

In any of the disclosed implementations, each of the necessary steps can be performed by a single entity (such as a profile provider) or with collaboration of multiple different entities (or equivalently, by computer systems controlled by a single entity or multiple computer systems each controlled by a different entity). For example, online user profile information used to select a television program can be collected by an online site controlled by one entity, while the online user profile information used to select the targeted advertisement can be collected by an ad server controlled by another entity.

Other specific examples include, but are not limited to: (a) a single entity can provide at least a portion of an online user profile, select a targeted television ad based on the online user profile, select a television program based on the online user profile, and arrange presentation of the selected ad in association with the selected program; (b) a first entity can select a targeted television ad based on online user profile information provided by a second entity, select a television program based on online user profile information provided by a third entity, and arrange presentation of the selected ad in association with the selected program; (c) a first entity can select a targeted television ad based on an online user profile, a second entity can select a television program based on the online user profile, and the second entity can arrange presentation of the selected ad in association with the selected program; or (d) a first entity can select a targeted television ad based on an online user profile, a second entity can select a television program based on the online user profile, the second entity can arrange transmission of the selected ad and the selected program to a television provider, and the television provider can arrange presentation of the selected ad in association with the selected program. Myriad other scenarios can be implemented.

In any of the examples including delivery of targeted television advertisements, those television ads can be provided by a wide variety of sources or entities. Above-referenced, incorporated applications Ser. Nos. 11/736,544 and 11/968,117 disclose examples of various sources for targeted television advertisements.

In any of the disclosed implementations, revenue can be generated and distributed among the involved entities in a wide variety of ways. Above-referenced, incorporated applications Ser. Nos. 11/736,544 and 11/968,117 disclose various examples, including some including the feature of compensating a profile provider for enabling targeting of television advertisements.

The systems and methods disclosed herein can be implemented as general or special purpose computers or other programmable hardware devices programmed through software, or as hardware or equipment "programmed" through hard wiring, or a combination of the two. Computer programs or other software, if used, can be implemented in temporary or permanent storage or in replaceable media, such as by including programming in microcode, object-oriented code, web-based or distributed software modules that operate together, RAM, ROM, CD-ROM, DVD-ROM, hard drives, thumb drives, flash memory, optical media, magnetic media, semiconductor media, or any future storage alternatives.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open-ended terminology, with the same meaning as if the phrase "at least" were appended after each instance thereof.

What is claimed is:

1. An automatic, computer-implemented method of presenting an advertisement targeted at a first user of a group of users, all users of the group of users having access to a first device that is Internet-connected and that can extract video programs delivered to the first device using streaming and Internet Protocol and present extracted content to the first user via a connected display device, the method comprising:
   with a computer server, during presentation of a first user-selected, streamed video program, automatically arranging for presenting a first video advertisement in association with the first user-selected, streamed video program, via the first device, based on a first online user profile of a plurality of online user profiles, each associated with a different user, which first online user profile is associated with the first user,
   wherein:
   (a) the first device is associated with each of the plurality of online user profiles;
   (b) each of the plurality of online user profiles is based on online activity from a respective online user interface device different from the first device;
   (c) the first online user profile is identified, from among the plurality of online user profiles, based on information from the first online user profile being more closely related to the first video program than information from the other online user profiles of the plurality of online user profiles; and
   (d) the first video advertisement is selected based on information from the first online user profile.

2. The method of claim 1 further comprising, with the computer server, during presentation of a second user-selected, streamed video program, automatically arranging for presenting a second video advertisement in association with the second user-selected, streamed video program, via the first device, based on a second online user profile of the plurality of online user profiles,
   wherein:
   (i) the second online user profile is identified, from among the plurality of online user profiles, based on information from the second online user profile being more closely related to the second video program than information from the other online user profiles of the plurality of online user profiles; and
   (ii) the second video advertisement is selected based on information from the second online user profile.

3. The method of claim 1 wherein the identifier of the first device and the identifiers of the respective online user interface devices are associated by virtue of having a common online access identifier.

4. The method of claim 1 wherein the first device is associated with each of the plurality of online user profiles by virtue of an identifier of the first device being referenced or included in the respective online user profiles.

5. The method of claim 1 wherein the computer server automatically arranging for presenting the first video advertisement in association with the first video program comprises arranging for presenting the first video advertisement in connection with a second video program having an identified relationship with the first video program.

6. The method of claim 1 wherein the first device is physically integrated with the connected display device.

7. The method of claim 1 wherein part (c) is performed by the computer server.

8. The method of claim 1 wherein an identification of the first online user profile is received by the computer server from another computer that performed part (c).

9. The method of claim 1 wherein an identification of the first video advertisement is received by the computer server from another computer that performed part (d).

10. A system comprising at least one computer server, which system is programmed and connected to automatically present an advertisement targeted at a first user of a group of users, all users of the group of users having access to a first device that is Internet-connected and that can extract video programs delivered to the first device using streaming and Internet Protocol and present extracted content to the first user via a connected display device, the computer server being programmed and connected to automatically, during presentation of a first user-selected, streamed video program, arrange for presenting a first video advertisement in association with the first user-selected, streamed video program, via the first device, based on a first online user profile of a plurality of online user profiles, each associated with a different user, which first online user profile is associated with the first user,
   wherein:
   (a) the first device is associated with each of the plurality of online user profiles;
   (b) each of the plurality of online user profiles is based on online activity from a respective online user interface device different from the first device;
   (c) the first online user profile is identified, from among the plurality of online user profiles, based on information from the first online user profile being more closely related to the first video program than information from the other online user profiles of the plurality of online user profiles; and
   (d) the first video advertisement is selected based on information from the first online user profile.

11. The system of claim 10 wherein the computer server is further programmed and connected to automatically, during presentation of a second user-selected, streamed video program, arrange for presenting a second video advertisement in association with the second user-selected, streamed video program, via the first device, based on a second online user profile of the plurality of online user profiles, wherein:
- (i) the second online user profile is identified, from among the plurality of online user profiles, based on information from the second online user profile being more closely related to the second video program than information from the other online user profiles of the plurality of online user profiles; and
- (ii) the second video advertisement is selected based on information from the second online user profile.

12. The system of claim 10 wherein the identifier of the first device and the identifiers of the respective online user interface devices are associated by virtue of having a common online access identifier.

13. The system of claim 10 wherein the computer server being programmed and connected to automatically arrange for presenting the first video advertisement in association with the first video program comprises the computer server being programmed and connected to arrange for presenting the first video advertisement in connection with a second video program having an identified relationship with the first video program.

14. The system of claim 10 wherein the first device is physically integrated with the connected display device.

15. The system of claim 10 wherein the computer system is further programmed to identify the first online user profile in accordance with part (c).

16. An article comprising a tangible computer-readable medium that is not a transitory propagating signal having program instructions embodied thereon, which, when executed by at least one tangible computer server, cause the at least one computer server to implement an automatic, computer-implemented method of presenting an advertisement targeted at a first user of a group of users, all users of the group of users having access to a first device that is Internet-connected and that can extract video programs delivered to the first device using streaming and Internet Protocol and present extracted content to the first user via a connected display device, the method comprising:

during presentation of a first user-selected, streamed video program, automatically arranging for presenting a first video advertisement in association with the first user-selected, streamed video program, via the first device, based on a first online user profile of a plurality of online user profiles, each associated with a different user, which first online user profile is associated with the first user,
wherein:
- (a) the first device is associated with each of the plurality of online user profiles;
- (b) each of the plurality of online user profiles is based on online activity from a respective online user interface device different from the first device;
- (c) the first online user profile is identified, from among the plurality of online user profiles, based on information from the first online user profile being more closely related to the first video program than information from the other online user profiles of the plurality of online user profiles; and
- (d) the first video advertisement is selected based on information from the first online user profile.

17. The article of claim 16 wherein the instructions, when executed by the at least one computer server, further cause the at least one computer server, during presentation of a second user-selected, streamed video program, to automatically arrange for presenting a second video advertisement in association with the second user-selected, streamed video program, via the first device, based on a second online user profile of the plurality of online user profiles,
wherein:
- (i) the second online user profile is identified, from among the plurality of online user profiles, based on information from the second online user profile being more closely related to the second video program than information from the other online user profiles of the plurality of online user profiles; and
- (ii) the second video advertisement is selected based on information from the second online user profile.

18. The article of claim 16 wherein the identifier of the first device and the identifiers of the respective online user interface devices are associated by virtue of having a common online access identifier.

19. The article of claim 16 wherein the method of automatically arranging for presenting the first video advertisement in association with the first video program, which the instructions cause the at least one computer server to perform, comprises the at least one computer server computer automatically arranging presenting the first video advertisement in connection with a second video program having an identified relationship with the first video program.

20. The article of claim 16 wherein the first device is physically integrated with the connected display device.

* * * * *